United States Patent
Bruckman et al.

(10) Patent No.: US 10,060,655 B2
(45) Date of Patent: Aug. 28, 2018

(54) TEMPERATURE CONTROL OF MULTI-STAGE CRYOCOOLER WITH LOAD SHIFTING CAPABILITIES

(71) Applicant: Raytheon Company, Waltham, MA (US)

(72) Inventors: Dawson R. Bruckman, Hawthorne, CA (US); Michael H. Kieffer, Redondo Beach, CA (US); Theodore J. Conrad, Redondo Beach, CA (US); Lowell A. Bellis, Long Beach, CA (US); Marwan Aryan, Torance, CA (US)

(73) Assignee: Raytheon Company, Waltham, MA (US)

( * ) Notice: Subject to any disclaimer, the term of this patent is extended or adjusted under 35 U.S.C. 154(b) by 752 days.

(21) Appl. No.: 14/456,821

(22) Filed: Aug. 11, 2014

(65) Prior Publication Data
US 2016/0040913 A1     Feb. 11, 2016

(51) Int. Cl.
*F25B 9/00*     (2006.01)
*F04B 37/08*    (2006.01)
(Continued)

(52) U.S. Cl.
CPC ............. *F25B 9/14* (2013.01); *F25B 9/10* (2013.01); *G05D 23/1902* (2013.01);
(Continued)

(58) Field of Classification Search
CPC .... F25B 9/00; F25B 9/14; F25B 9/145; F25B 2600/02; F25B 9/10; F25B 49/022;
(Continued)

(56) References Cited

U.S. PATENT DOCUMENTS

| | | |
|---|---|---|
| 5,018,357 A | 5/1991 | Livingstone et al. |
| 5,032,772 A | 7/1991 | Gully et al. |

(Continued)

FOREIGN PATENT DOCUMENTS

| | | |
|---|---|---|
| JP | S59208360 A | 11/1984 |
| JP | 09033124 A | 2/1997 |

(Continued)

OTHER PUBLICATIONS

Shilov, Georgi E. Fundamentals of Thermodynamic Stability. (1977). Dover Publications. 1st edition, pp. 32-41.*

(Continued)

*Primary Examiner* — Frantz Jules
*Assistant Examiner* — Erik Mendoz-Wilkenfe

(57) ABSTRACT

A system includes a multi-stage cryocooler having multiple stages and a temperature control system configured to regulate temperatures of the multiple stages of the multi-stage cryocooler. The temperature control system includes an input interface configured to receive (i) temperature setpoints for the stages of the multi-stage cryocooler and (ii) temperature information corresponding to temperatures measured at the stages of the multi-stage cryocooler. The temperature control system also includes processing circuitry configured to determine temperature errors and calculate at least one of a compressor stroke error and a pressure-volume phase error. The temperature control system further includes at least one controller configured to adjust at least one of a compressor setting and a pressure-volume phase of the multi-stage cryocooler.

20 Claims, 4 Drawing Sheets

(51) Int. Cl.
  *B01D 8/00* (2006.01)
  *G05D 23/00* (2006.01)
  *F25B 9/10* (2006.01)
  *F25B 49/02* (2006.01)
  *F25B 9/14* (2006.01)
  *G05D 23/19* (2006.01)
  *G05D 23/20* (2006.01)

(52) U.S. Cl.
  CPC ..... *F25B 49/022* (2013.01); *F25B 2309/1428* (2013.01); *G05D 23/20* (2013.01)

(58) Field of Classification Search
  CPC ............ F15B 1/021; G05D 23/1902; G05D 23/1931; F04B 37/08; F04B 37/085; B01D 8/00
  See application file for complete search history.

(56) References Cited

U.S. PATENT DOCUMENTS

| | | | | |
|---|---|---|---|---|
| 5,535,593 | A | * | 7/1996 | Wu ............ F25B 9/14 62/228.5 |
| 5,715,693 | A | * | 2/1998 | van der Walt ............ F25B 5/04 62/198 |
| 6,330,800 | B1 | | 12/2001 | Price et al. |
| 2005/0229608 | A1 | | 10/2005 | Keiter et al. |
| 2010/0037639 | A1 | | 2/2010 | Ogden et al. |
| 2011/0000228 | A1 | | 1/2011 | Harvey et al. |
| 2013/0047632 | A1 | * | 2/2013 | Rillo Millan ............ F25B 9/00 62/6 |

FOREIGN PATENT DOCUMENTS

| | | | |
|---|---|---|---|
| JP | 2001272126 | A | 10/2001 |
| JP | 2003279185 | A | 10/2003 |
| JP | 2008292103 | A | 12/2008 |
| JP | 2011521201 | A | 7/2011 |
| JP | 2013531773 | A | 8/2013 |
| JP | 2014508274 | A | 4/2014 |

OTHER PUBLICATIONS

S.W.K. Yuan et al., "A New Load-Shifting Concept for Multistage Cryocoolers", International Cryocooler Conference, Inc., 2009, p. 89-96.

M.A. Jackson et al., "21st Century Cryocooler Electronics", International Cryocooler Conference, Inc., 2009, p. 607-611.

M.V. Zagarola et al., Demonstration of a Two-Stage Turbo-Brayton Cryocooler for Space Applications, International Cryocooler Conference, Inc., 2009, p. 461-469.

Notification of Transmittal of the International Search Report and the Written Opinion of the International Searching Authority, or the Declaration dated Sep. 28, 2015, in connection with International Patent Application No. PCT/US2015/035362.

Japanese Office Action in related counterpart Japanese Patent Application No. 2017-507409 dated Jan. 23, 2018, 6 pages.

* cited by examiner

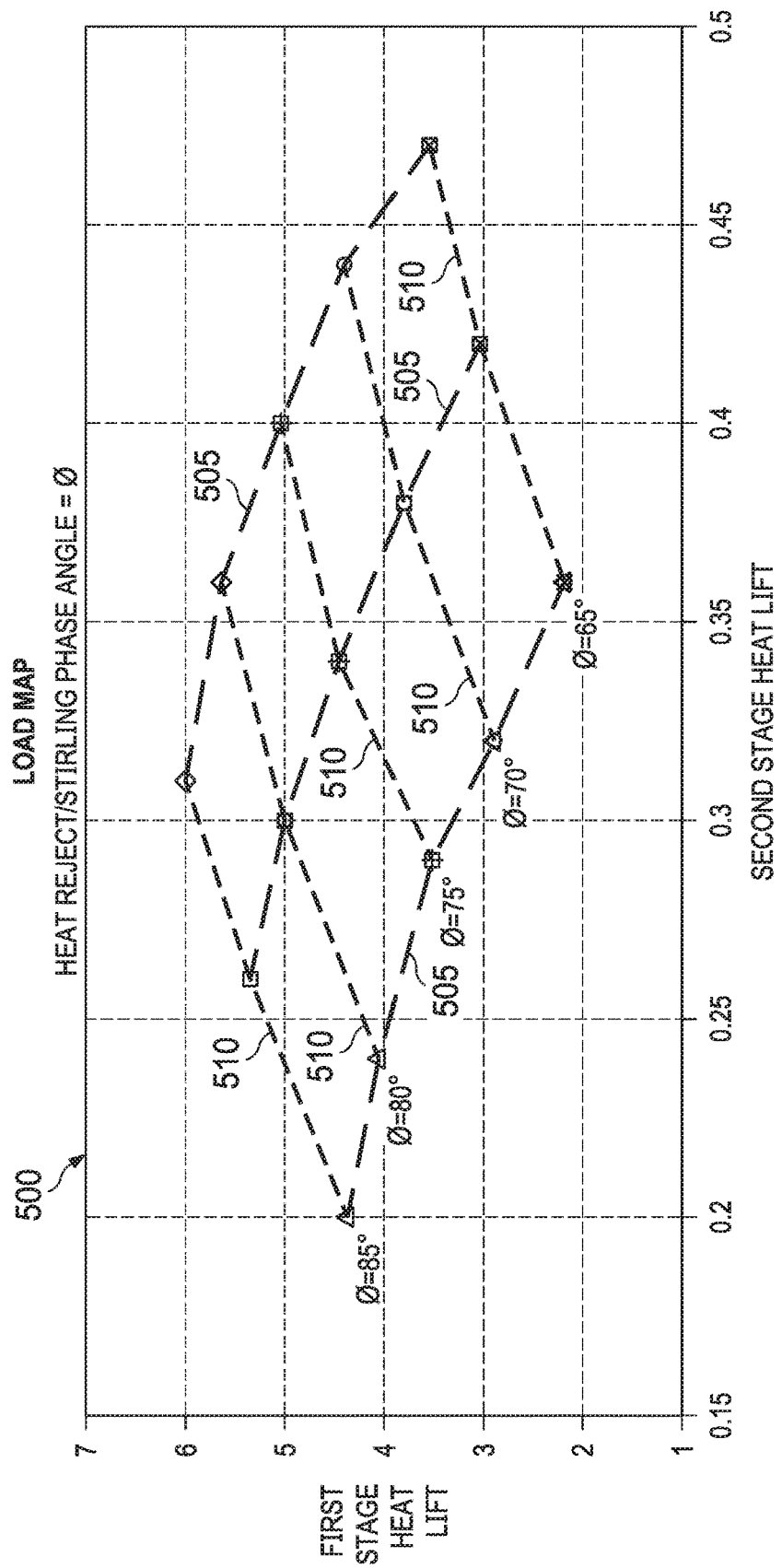

TEMPERATURE CONTROL OF MULTI-STAGE CRYOCOOLER WITH LOAD SHIFTING CAPABILITIES

GOVERNMENT LICENSE RIGHTS

This invention was made with U.S. Government support. The U.S. Government may have certain rights in this invention.

TECHNICAL FIELD

This disclosure is directed generally to cryocoolers. More particularly, this disclosure is directed to temperature control of a multi-stage cryocooler with load shifting capabilities.

BACKGROUND

A cryocooler is a thermal management device configured to extract heat from an object and, in doing so, cool the object to cryogenic temperatures. Many cryocoolers are designed to provide cooling to temperatures ranging from about 1.7 K to about 300 K (about −456° F. to about 80° F.). Cryocoolers can be used in many applications, including infrared detectors, space applications, space infrared sensor systems, and so forth.

SUMMARY

This disclosure provides temperature control of a multi-stage cryocooler with load shifting capabilities.

In a first embodiment, an apparatus includes a temperature control system configured to regulate temperatures of multiple stages of a multi-stage cryocooler. The temperature control system includes an input interface configured to receive (i) temperature setpoints for the stages of the multi-stage cryocooler and (ii) temperature information corresponding to temperatures measured at the stages of the multi-stage cryocooler. The temperature control system also includes processing circuitry configured to determine temperature errors and calculate at least one of a compressor stroke error and a pressure-volume phase error. The temperature control system further includes at least one controller configured to adjust at least one of a compressor setting and a pressure-volume phase of the multi-stage cryocooler.

In a second embodiment, a system includes a multi-stage cryocooler having multiple stages and a temperature control system configured to regulate temperatures of the multiple stages of the multi-stage cryocooler. The temperature control system includes an input interface configured to receive (i) temperature setpoints for the stages of the multi-stage cryocooler and (ii) temperature information corresponding to temperatures measured at the stages of the multi-stage cryocooler. The temperature control system also includes processing circuitry configured to determine temperature errors and calculate at least one of a compressor stroke error and a pressure-volume phase error. The temperature control system further includes at least one controller configured to adjust at least one of a compressor setting and a pressure-volume phase of the multi-stage cryocooler.

In a third embodiment, a method includes cooling an object using a multi-stage cryocooler having multiple stages and regulating a temperature of each stage of the multi-stage cryocooler. Regulating the temperature of each stage includes receiving (i) temperature setpoints for the stages of the multi-stage cryocooler and (ii) temperature information corresponding to temperatures measured at the stages of the multi-stage cryocooler. Regulating the temperature of each stage also includes determining temperature errors using the temperature setpoints and the temperature information and calculating at least one of a compressor stroke error and a pressure-volume phase error using the temperature errors. Regulating the temperature of each stage further includes adjusting at least one of a compressor setting and a pressure-volume phase of the multi-stage cryocooler using at least one of the compressor stroke error and the pressure-volume phase error.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates an example load map for controlling a temperature in a multi-stage cryocooler according to this disclosure.

DETAILED DESCRIPTION

Figure 1:
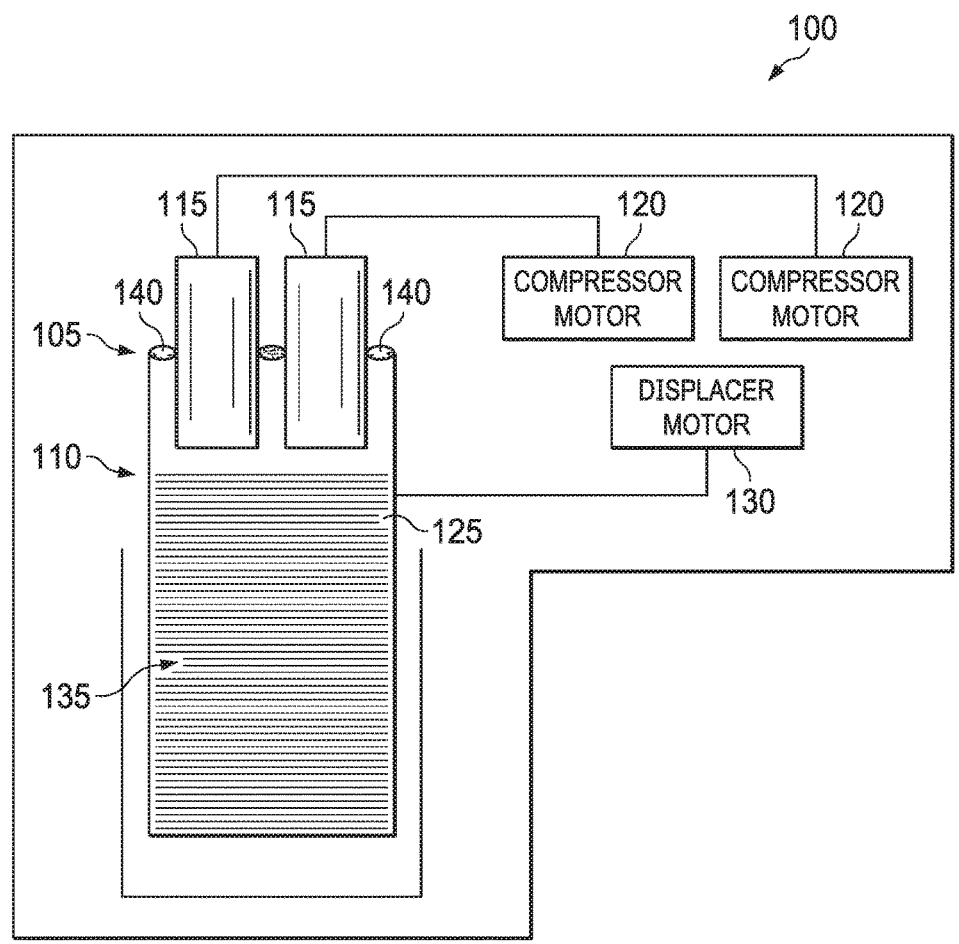
FIG. 1 illustrates an example cryocooler according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Various types of cryocoolers have been designed and used in a number of different applications. For example, in a hybrid Stirling-Pulse Tube multi-stage cryocooler, the control inputs available (compressor stroke and pressure-volume phase) do not adjust a heat lift on the individual stages independently. The pressure volume (PV) phase is the phase of the thermodynamic process in the expander. One of the control inputs is compressor power and the other is an adjustment of the phase relationship between the Pressure and Volume waveforms in the expander. For example, the pressure-volume phase can be a displacer phase. The displacer phase is driven by the compressor, which sends a pressure wave to the displacer phase. In a first stage, the expander pre-cools the gas that enters the second stage, and the second stage pre-cools the gas that enters the third stage, and so forth. A cooling capacity for each stage is proportional to the swept volume of the expansion space. Most applications of a multi-stage cryocooler would be better served if the temperature of both stages could be controlled independently, which can involve decoupling the effects of the control variables (such as the compressor stroke and the pressure-volume phase) on the individual stages. One benefit of independent control of the heat lift at each stage is to decrease the temperature settling time associated with heat load changes at a single stage.

This disclosure provides a control system configured to regulate a temperature for each stage of a multi-stage cryocooler. Certain embodiments provide a multi-stage cryocooler with load shifting capabilities, which offers the potential for adjustment of the heat lift at each stage of the cryocooler. Certain embodiments are also configured to independently regulate the stages of a multi-stage cryocooler such that the temperatures of the stages can be independently controlled. Certain embodiments further support decoupling the effects of control variables (such as compressor stroke and pressure-volume phase) on the individual stages. In addition, certain embodiments provide a system and method for independent control of the heat lift at each stage to decrease the temperature settling time associated with heat load changes at a single stage. Further, certain embodiments independently control the temperatures/heat lifts at each cryocooler stage of a multi-stage cryocooler with load shifting capabilities by simultaneously adjusting multiple cryocooler operational parameter inputs (compressor power, pressure-volume phase, and the like). Certain embodiments control the PV phase by adjusting the displacement cylinder phase; however, other embodiments could use different methods to control that PV phase. Embodiments of the present disclosure describe a displacement phase to illustrate the PV phase. Although the term displacement phase is utilized herein below, embodiments utilizing a pressure-volume phase apply equally without departing from the scope of the present disclosure.

FIG. 1 illustrates an example cryocooler 100 according to this disclosure. Although certain details will be provided with reference to the components of the cryocooler 100 of FIG. 1, it should be understood that other embodiments may include more, less, or different components.

The cryocooler 100 of FIG. 1 is a thermal management device configured to extract heat from an object by compressing and expanding a working gas (such as helium, hydrogen, air, or the like) in a thermodynamic cycle. The cryocooler 100 operates in this manner to extract heat from an object and, in doing so, cool the object to cryogenic temperatures, such as below 150 K. In some embodiments, the cryocooler 100 is designed to provide cooling to temperatures ranging from about 1.7 K to about 300 K (about −456° F. to about 80° F.). In particular embodiments, the cryocooler 100 is a Stirling cycle cryocooler configured to progress through successive steps of isothermal compression, isochoric cooling, isothermal expansion, and isochoric heating. The cryocooler 100 can be configured for use in many applications, including infrared detectors, space applications, space infrared sensor systems, and so forth.

As shown in FIG. 1, the cryocooler 100 includes a compressor 105 and a displacer 110 sealed inside a housing. The compressor 105 includes two compressor piston 115 each individually coupled to a respective compressor motor 120. The compressor motors 120 are configured to apply a force to the respective compressor pistons 115 in order to cause the compressor pistons 115 to move back and forth. The compressor motors 120 represent any suitable type of motor, such as an electrical motor, a mechanical motor, an electromechanical motor, or a computer-driven motor.

The displacer 110 includes a displacer cylinder 125 coupled to a displacer motor 130. The displacer motor 130 moves the displacer cylinder 125 back and forth at the same frequency as the compressor piston 115. The displacer motor 130 represents any suitable type of motor, such as an electrical motor, a mechanical motor, an electromechanical motor, or a computer-driven motor. A regenerator 135 is coupled to the displacer cylinder 125 and moves with the displacer cylinder 125. A seal 140 is coupled between the displacer cylinder 125 and the compressor pistons 115.

Figure 2:
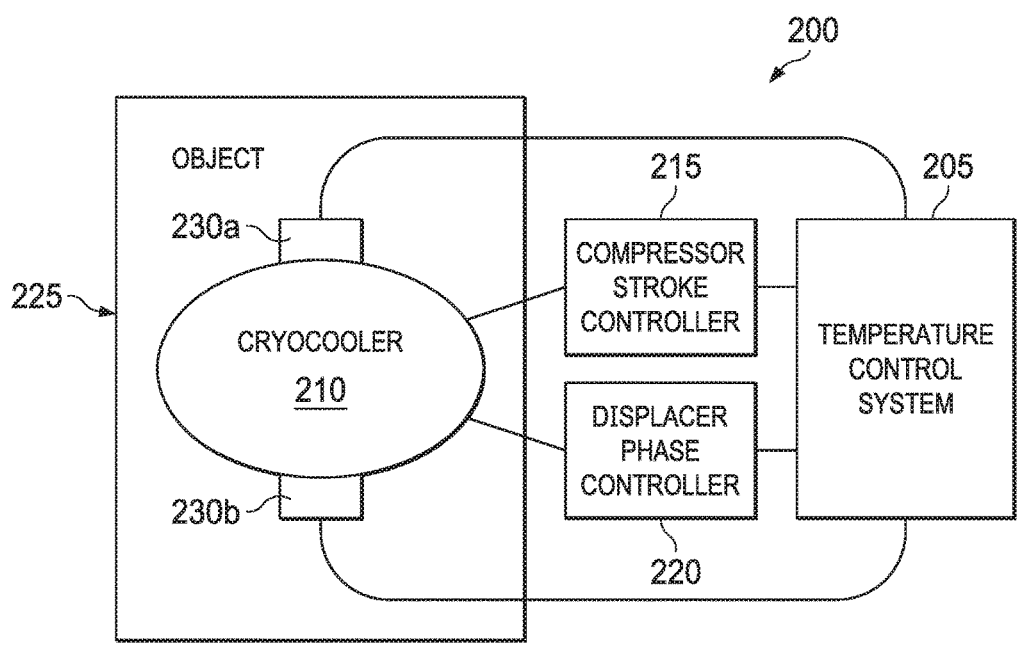
FIG. 2 illustrates an example system including a temperature control system and a cryocooler according to this disclosure.

FIG. 2 illustrates an example system 200 including a temperature control system (TCS) 205 and a cryocooler 210 according to this disclosure. The cryocooler 210 can represent a multi-stage cryocooler with load shifting capabilities, and the TCS 205 can independently regulate the stages of the multi-stage cryocooler 210 such that the temperature of the stages are independently controlled. Although certain details will be provided with reference to the components of the system 200 of FIG. 2, it should be understood that other embodiments may include more, less, or different components.

As shown in FIG. 2, the system 200 includes the TCS 205, the cryocooler 210, a compressor stroke controller (CSC) 215, and a displacer phase controller (DPC) 220. The cryocooler 210 could represent the cryocooler 100 of FIG. 1 or any other suitable cryocooler.

The TCS 205 is coupled to the cryocooler 210 via a number of sensors 230a-230b, the CSC 215, and the DPC 220. The TCS 205 receives temperature information regarding different stages via respective sensors 230a-230b. The TCS 205 controls one or more stages of the cryocooler 210 via one or more of the CSC 215 and the DPC 220. In response to receiving the temperature information from the sensors 230a-230b, the TCS 205 is configured to independently control a temperature of each stage of the cryocooler 210. For example, the TCS 205 can independently control a heat lift at each stage, decreasing the temperature settling time associated with heat load changes at a single stage.

The sensors 230a-230b are configured to measure temperatures of respective stages of the cryocooler 210. For example, a first temperature sensor 230a can be configured to measure a temperature of a first stage of the cryocooler 210, and a second temperature sensor 230b can be configured to measure a temperature of a second stage of the cryocooler 210. In the example shown in FIG. 2, the cryocooler 210 includes two stages, although other embodiments with more stages could be used. The temperature information from the sensors 230a-230b could represent measurements of actual temperatures, temperature differentials, or other temperature measurements. A temperature differential can represent a temperature error, such as a difference between a preferred or ideal temperature and a measured temperature or a difference between a measure temperature and a higher or lower temperature value in a range of preferred or ideal temperatures. In some embodiments, the temperature information includes an indication of whether the temperature is higher or lower than a preferred temperature or preferred temperature range.

The TCS 205 is configured to independently control a temperature of each stage of the cryocooler 210 via a respective one of the CSC 215 and the DPC 220. The CSC 215 is configured to control a compressor stroke setting of the compressor 105 in the cryocooler 210, while the DPC 220 is configured to control a displacement phase of the displacement cylinder 125 in the displacer 110 of the cryocooler 210.

In response to receiving the temperature information from the sensors 230a-230b, the TCS 205 can determine a temperature error with regard to one or more stages of the cryocooler 210. Using this information, the TCS 205 can then compute a compressor stroke error or displacement phase error. That is, the TCS 205 can compute an amount to adjust a temperature of the compressor, the displacement cylinder, or both. The TCS 205 can command the CSC 215 to adjust the compressor stroke of the compressor 105, or the TCS 205 can command the DPC 220 to adjust a displacement phase of the displacement cylinder 125. Additionally, the TCS 205 can command that adjustments be made by both the CSC 215 and the DPC 220.

Figure 3:
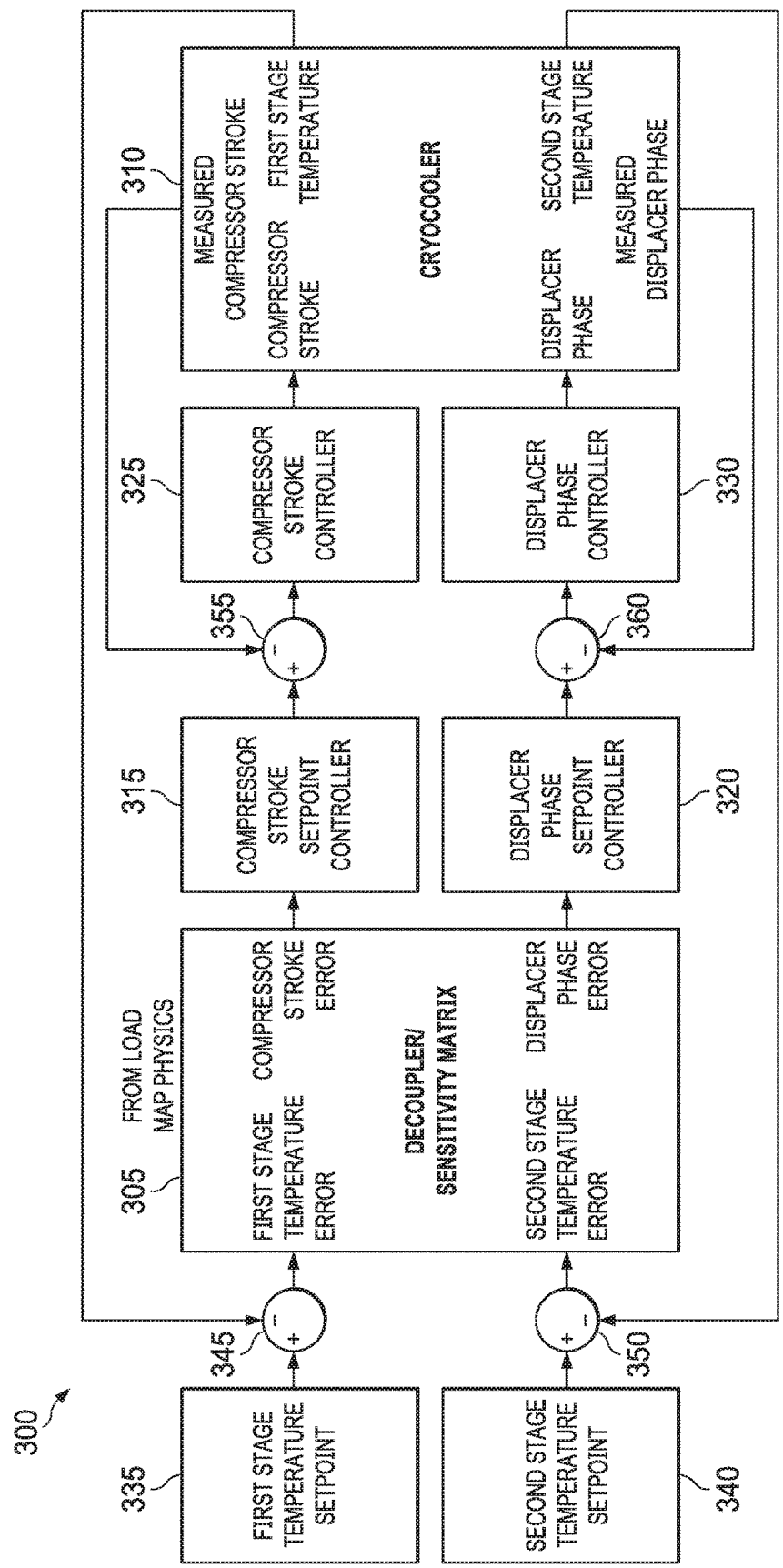
FIG. 3 illustrates an example temperature control system for a multi-stage cryocooler according to this disclosure.

FIG. 3 illustrates an example temperature control system (TCS) 300 for a multi-stage cryocooler 310 according to this disclosure. The TCS 300 provides the multi-stage cryocooler 310 with load shifting capabilities and independently regulates the stages of the cryocooler 310 such that the temperatures of the stages can be independently controlled. Although certain details will be provided with reference to the components of the TCS 300 and cryocooler 310 of FIG. 3, it should be understood that other embodiments may include more, less, or different components.

The TCS 300 here includes a temperature controller 305, a compressor stroke setpoint controller (CSSPC) 315, a displacer phase setpoint controller (DPSPC) 320, a CSC 325, and a DPC 330. The temperature controller 305 includes processing circuitry configured to independently regulate the stages of the cryocooler 310, such as to independently control the heat lift at each stage in order to decrease the temperature settling time associated with heat load changes at a single stage. The temperature controller 305 decouples the effects of control variables (such as compressor stroke and displacer phase) on the individual stages. For example, the temperature controller 305 can receive one or more temperature setpoints 335-340 corresponding to the respective stages of the cryocooler 310, such as from a user via an operator interface including a display, a touchscreen, an audio input, or other input/output device(s). The setpoints 335-340 can be stored in an internal memory of the temperature controller 305.

The temperature controller 305 is coupled to the cryocooler 310 via a number of sensors, the CSSPC 315, the CSC 325, the DPSPC 320, and the DPC 330. The temperature controller 305 can receive temperature information regarding a cryocooler stage via a respective sensor. Various sensors can be configured to measure temperatures of respective stages of the cryocooler 310. In the example shown in FIG. 3, the cryocooler 310 includes two stages, although embodiments with more stages could be used. Again, the temperature information could represent measurements of actual temperatures, temperature differentials, or other temperature measurements.

In some embodiments, the temperature controller 305 includes or is coupled to a number of comparators configured to compare a measured temperature with a temperature setpoint. For example, a first comparator 345 receives and compares the measured temperature of the first stage of the cryocooler 310 with the temperature setpoint 335, and a second comparator 350 receives and compares the measured temperature of the second stage of the cryocooler 310 with the temperature setpoint 340. The comparators 345-350 compute temperature differentials or temperature errors for the stages of the cryocooler 310 based on the result of the comparisons. The temperature errors calculated by the comparators 345-350 are provided to the temperature controller 305.

In response to receiving the temperature information, the temperature controller 305 generates a Decoupler/Sensitivity matrix. The Decoupler/Sensitivity matrix is calculated as the inverse of the measured linearized response data measured from the cryocooler 310. The temperature controller 305 applies the temperature information to the Decoupler/Sensitivity matrix to calculate a compressor stroke error and a displacement phase error. For example, the temperature controller 305 can apply a temperature differential or temperature error to the Decoupler/Sensitivity matrix to compute an amount to change a compressor stroke (compressor stroke error) and an amount to change a displacement phase (displacement phase error) for each stage. In addition, the Decoupler/Sensitivity matrix can be a function of operating condition. For example, the decoupler matrix can equal A when controlling at 55K and 10K but will equal B when controlling at 85K and 30K and that can be stored or measured as a set of load maps.

The temperature controller 305 controls one or more stages of the cryocooler 310 via one or more of the CSC 325 and the DPC 330. The temperature controller 305 provides the compressor stroke error to the CSSPC 315, which calculates a new compressor stroke setpoint. The temperature controller 305 also provides the displacement phase error to the DPSPC 320, which calculates a new displacement phase setpoint. For example, the DPSPC 320 can be configured to receive a pressure-volume (displacement) phase measured at the cryocooler 310 and the pressure-volume (displacement) phase error, the DPSPC 320 configured to cause the DPC 330 to adjust a phase relationship between a pressure waveform and a volume waveform in the pressure-volume (displacement) phase of the cryocooler 310.

A third comparator 355 receives and compares the new compressor stroke setpoint from the CSSPC 315 and a compressor stroke measured at the compressor of the cryocooler 310. A fourth comparator 360 receives and compares the new displacement phase setpoint from the DSSPC 320 and a displacement phase measured at the displacement cylinder of the cryocooler 310. In some embodiments, the third comparator 355 is part of the CSC 325, and the fourth comparator 360 is part of the DPC 330.

The CSC 325 determines an amount to adjust the compressor stroke of the cryocooler 310 based on the comparison of the new compressor stroke setpoint and the measured compressor stroke. The CSC 325 then adjusts the compressor stroke of the compressor of the cryocooler 310 by the deter mined amount. The DPC 330 determines an amount to adjust the displacement phase of the cryocooler 310 based on the comparison of the new displacement phase setpoint and the measured displacement phase. The DPC 330 then adjusts the displacement phase of the displacement cylinder in the cryocooler 310 by the determined amount by adjusting the phase relationship between the pressure waveform and the volume waveform in the cryocooler 310. Accordingly, in response to receiving the temperature information regarding the cryocooler 310, the temperature controller 305 is configured to independently control a temperature of each stage of the cryocooler 310.

Figure 4:
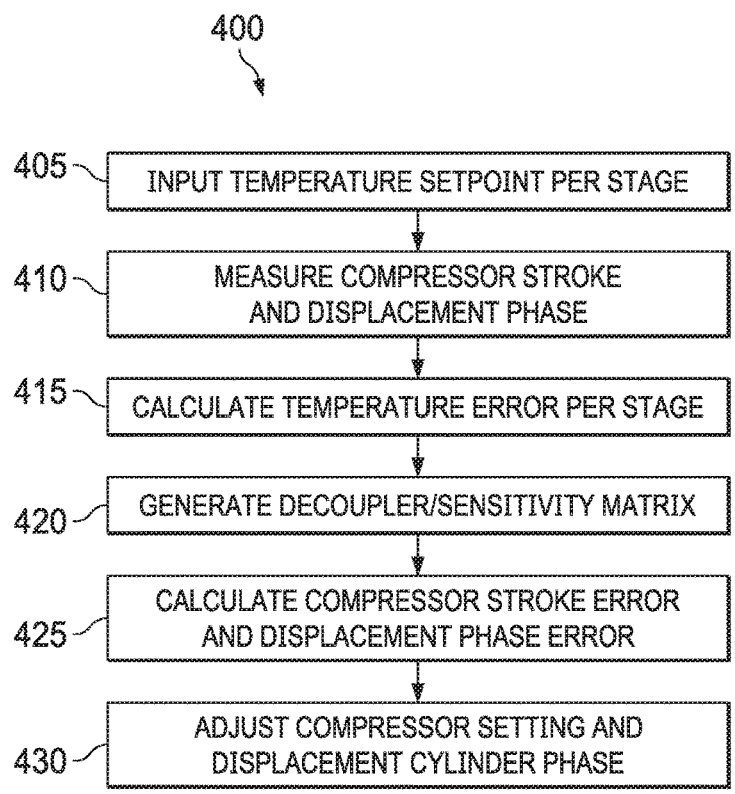
FIG. 4 illustrates an example process for controlling a temperature in a multi-stage cryocooler according to this disclosure.

FIG. 4 illustrates an example process 400 for controlling a temperature in a multi-stage cryocooler according to this disclosure. The scenario shown in FIG. 4 corresponds to a multi-stage cryocooler with two stages, although more stages could be used. The process 400 shown in FIG. 4 may be utilized with components described in one or more of FIGS. 1 through 3 or with other components.

At step 405, a temperature controller receives temperature setpoints corresponding to respective stages of a multi-stage cryocooler. In some embodiments, one or more setpoints, such as temperature setpoints, are stored in an internal memory of the temperature controller.

At step 410, one or more sensors measure temperatures of respective stages of the cryocooler. The sensors provide the measured temperatures as part of temperature information to the temperature controller. In some embodiments, the measured temperatures are provided to one or more comparators configured to compare the measured temperatures to the corresponding setpoints.

A temperature error is calculated per stage at step 415. At step 420, the temperature controller generates a Decoupler/Sensitivity matrix. The Decoupler/Sensitivity matrix is the inverse of the measured linearized data response of the multi-stage cryocooler. In some embodiments, the Decoupler/Sensitivity matrix is pre-stored in a memory of the temperature controller.

The temperature controller applies the temperature errors to the Decoupler/Sensitivity matrix to calculate a compressor stroke error and a displacement phase error at step 425. At step 430, the CSC and DPC adjust the compressor setting and displacement cylinder phase. One or more sensors can measure the compressor setting, the displacement cylinder phase, or both. The sensors can provide the measured compressor setting, the displacement cylinder phase, or both to the CSC and DPC. In some embodiments, the measured compressor setting and displacement cylinder phase are provided to one or more comparators configured to compare the measured compressor setting and displacement cylinder phase to corresponding setpoints to calculate an amount to adjust the compressor setting and an amount to adjust the displacement cylinder phase. The CSC and DPC use the calculated amounts to adjust the compressor setting and the displacement cylinder phase. For example, the DPC can be configured to receive a pressure-volume (displacement) phase measured at the cryocooler and the pressure-volume (displacement) phase error, adjust a phase relationship between a pressure waveform and a volume waveform in the pressure-volume (displacement) phase of the cryocooler.

FIG. 5 illustrates an example load map 500 for controlling a temperature in a multi-stage cryocooler according to this disclosure. The load map 500 shown in FIG. 5 corresponds to a multi-stage cryocooler with two stages, although more stages or different temperature ranges could be used. This load map 500 may be utilized with components described in one or more of FIGS. 1 through 3 or with other components.

The example load map 500 corresponds to measurements taken of a multi-stage cryocooler as a performance metric, namely response data. To obtain the load map 500, all inputs to the cryocooler are maintained constant except for one: either the Stirling phase angle or the compressor input power is varied. A first series of lines 505 indicates the response of heat lifts at each stage due to changes in phase angle at constant compressor powers. A second series of lines 510 depicts the response of heat lifts at each stage due to changes in compressor power with constant phase angle. The response of one control input to all outputs is fairly linear, so the load map 500 illustrates how a change in one input affects all outputs in the system.

Figure 6:
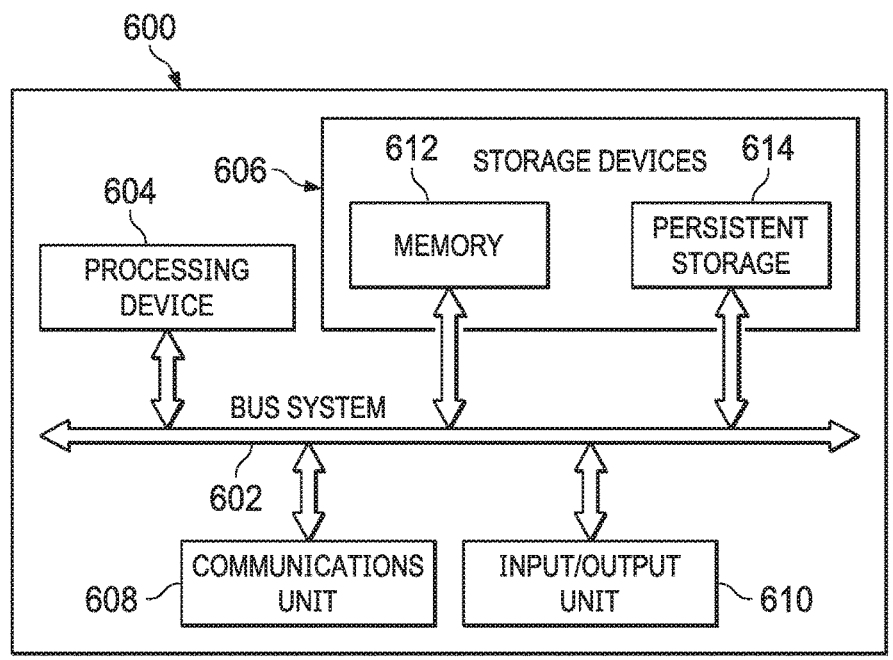
FIG. 6 illustrates an example computer that may be used for controlling a temperature in a multi-stage cryocooler according to this disclosure.

FIG. 6 illustrates an example computer 600 that may be used for controlling a temperature in a multi-stage cryocooler according to this disclosure. As shown in FIG. 6, the device 600 includes a bus system 602, which supports communication between at least one processing device 604, at least one storage device 606, at least one communications unit 608, and at least one input/output (I/O) unit 610.

The processing device 604 executes instructions that may be loaded into a memory 612. The processing device 604 may include any suitable number(s) and type(s) of processors or other devices in any suitable arrangement. Example types of processing devices 604 include microprocessors, microcontrollers, digital signal processors, field programmable gate arrays, application specific integrated circuits, and discrete circuitry.

The memory 612 and a persistent storage 614 are examples of storage devices 606, which represent any structure(s) capable of storing and facilitating retrieval of information (such as data, program code, and/or other suitable information on a temporary or permanent basis). The memory 612 may represent a random access memory or any other suitable volatile or non-volatile storage device(s). The persistent storage 614 may contain one or more components or devices supporting longer-term storage of data, such as a ready only memory, hard drive, Flash memory, or optical disc.

The communications unit 608 supports communications with other systems or devices. For example, the communications unit 608 could include a network interface card that facilitates communications over at least one Ethernet network. The communications unit 608 could also include a wireless transceiver facilitating communications over at least one wireless network. The communications unit 608 may support communications through any suitable physical or wireless communication link(s).

The I/O unit 610 allows for input and output of data. For example, the I/O unit 610 may provide a connection for user input through a keyboard, mouse, keypad, touchscreen, or other suitable input device. The I/O unit 610 may also send output to a display, printer, or other suitable output device.

Although FIGS. 1 through 6 illustrate example cryocoolers and temperature control systems, various changes may be made to FIGS. 1 through 6. For example, it will be understood that well-known processes have not been described in detail and have been omitted for brevity. Although specific steps, structures and materials may have been described, this disclosure may not be limited to these specifics, and others may be substituted as it is well understood by those skilled in the art, and various steps may not necessarily be performed in the sequences shown. Moreover, any suitable multi-stage cryocooler could be used with the temperature control systems described above. In addition, the functional divisions shown in the temperature control systems are for illustration only, and various components could be combined, further subdivided, omitted, rearranged, or added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

To aid the Patent Office and any readers of any patent issued on this application in interpreting the claims appended hereto, the applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. An apparatus comprising:
a temperature control system configured to independently regulate a temperature of each of multiple stages of a multi-stage cryocooler, the temperature control system comprising:
an input interface configured to receive (i) a temperature setpoint for each of the multiple stages of the multi-stage cryocooler and (ii) temperature information corresponding to a temperature measured at each of the multiple stages of the multi-stage cryocooler; and
at least one processor comprising circuitry, and configured to:
determine temperature errors based on the temperature setpoint for each of the multiple stages and the temperature information and calculate, for each of the multiple stages of the multi-stage cryocooler, at least one of a compressor stroke error and a pressure-volume phase error based on the temperature errors; and
adjust at least one of a compressor setting and a pressure-volume phase of the multi-stage cryocooler based on at least one of the compressor stroke error and the pressure-volume phase error.

2. The apparatus of claim 1, further comprising:
multiple sensors configured to measure the temperature of each of the multiple stages and provide the temperature information.

3. The apparatus of claim 1, wherein the temperature information comprises at least one of a temperature differential, a value representative of the temperature differential, an actual temperature, a value representative of the actual temperature, an indication of whether the temperature is higher or lower than a preferred temperature, and an indication of whether the temperature is higher or lower than a preferred temperature range.

4. The apparatus of claim 1, wherein the at least one processor is configured to calculate the compressor stroke error and the pressure-volume phase error by applying the determined temperature errors to a Decoupler/Sensitivity matrix.

5. The apparatus of claim 4, wherein the at least one processor is configured to generate the Decoupler/Sensitivity matrix as an inverse of measured linearized response data from the multi-stage cryocooler.

6. The apparatus of claim 1, wherein the at least one processor is configured to receive the compressor setting measured at the multi-stage cryocooler and, using the compressor stroke error, adjust the compressor setting of the multi-stage cryocooler.

7. The apparatus of claim 1, wherein the at least one processor is configured to receive the pressure-volume phase measured at the multi-stage cryocooler and, using the pressure-volume phase error, adjust a phase relationship between a pressure waveform and a volume waveform in the pressure-volume phase of the multi-stage cryocooler.

8. A system comprising:
a multi-stage cryocooler comprising multiple stages; and
a temperature control system configured to independently regulate a temperature of each of the multiple stages of the multi-stage cryocooler, the temperature control system comprising:
an input interface configured to receive (i) a temperature setpoint for each of the multiple stages of the multi-stage cryocooler and (ii) temperature information corresponding to a temperature measured at each of the multiple stages of the multi-stage cryocooler; and
at least one processor comprising circuitry, and configured to:
determine temperature errors based on the temperature setpoint for each of the multiple stages and the temperature information and calculate, for each of the multiple stages of the multi-stage cryocooler, at least one of a compressor stroke error and a pressure-volume phase error based on the temperature errors; and
adjust at least one of a compressor setting and a pressure-volume phase of the multi-stage cryocooler based on at least one of the compressor stroke error and the pressure-volume phase error.

9. The system of claim 8, further comprising:
multiple sensors configured to measure the temperature of each of the multiple stages and provide the temperature information.

10. The system of claim 8, wherein the temperature information comprises at least one of a temperature differential, a value representative of the temperature differential, an actual temperature, a value representative of the actual temperature, an indication of whether the temperature is higher or lower than a preferred temperature, and an indication of whether the temperature is higher or lower than a preferred temperature range.

11. The system of claim 8, wherein the at least one processor is configured to calculate the compressor stroke error and the pressure-volume phase error by applying the determined temperature errors to a Decoupler/Sensitivity matrix.

12. The system of claim 11, wherein the at least one processor is configured to generate the Decoupler/Sensitivity matrix as an inverse of measured linearized response data from the multi-stage cryocooler.

13. The system of claim 8, wherein the at least one processor is configured to receive the compressor setting measured at the multi-stage cryocooler and, using the compressor stroke error, adjust the compressor setting of the multi-stage cryocooler.

14. The system of claim 8, wherein the at least one processor is configured to receive the pressure-volume phase measured at the multi-stage cryocooler and, using the pressure-volume phase error, adjust a phase relationship between a pressure waveform and a volume waveform in the pressure-volume phase of the multi-stage cryocooler.

15. A method comprising:
   cooling an object using a multi-stage cryocooler comprising multiple stages; and
   independently regulating a temperature of each of the multiple stages of the multi-stage cryocooler by:
      receiving (i) a temperature setpoint for each of the multiple stages of the multi-stage cryocooler and (ii) temperature information corresponding to a temperature measured at each of the multiple stages of the multi-stage cryocooler;
      determining temperature errors using the temperature setpoint for each of the multiple stages and the temperature information;
      calculating, for each of the multiple stages of the multi-stage cryocooler, at least one of a compressor stroke error and a pressure-volume phase error using the temperature errors; and
      adjusting at least one of a compressor setting and a pressure-volume phase of the multi-stage cryocooler using at least one of the compressor stroke error and the pressure-volume phase error.

16. The method of claim 15, further comprising:
   measuring the temperature of each of the multiple stages of the multi-stage cryocooler using multiple sensors.

17. The method of claim 15, wherein the temperature information comprises at least one of a temperature differential, a value representative of the temperature differential, an actual temperature, a value representative of the actual temperature, an indication of whether the temperature is higher or lower than a preferred temperature, and an indication of whether the temperature is higher or lower than a preferred temperature range.

18. The method of claim 15, wherein calculating at least one of the compressor stroke error and the pressure-volume phase error comprises:
   applying the temperature errors to a Decoupler/Sensitivity matrix.

19. The method of claim 18, further comprising:
   generating the Decoupler/Sensitivity matrix as an inverse of measured linearized response data from the multi-stage cryocooler.

20. A method comprising:
   cooling an object using a multi-stage cryocooler comprising multiple stages; and
   independently regulating a temperature of each of the multiple stages of the multi-stage cryocooler by:
      receiving (i) a temperature setpoint for each of the multiple stages of the multi-stage cryocooler and (ii) temperature information corresponding to a temperature measured at each of the multiple stages of the multi-stage cryocooler;
      determining temperature errors using the temperature setpoint for each of the multiple stages and the temperature information;
      calculating a compressor stroke error and a pressure-volume phase error using the temperature errors; and
      adjusting a compressor setting and a pressure-volume phase of the multi-stage cryocooler using the compressor stroke error and the pressure-volume phase error by:
         receiving the compressor setting measured at the multi-stage cryocooler and the compressor stroke error;
         adjusting the compressor setting of the multi-stage cryocooler;
         receiving the pressure-volume phase measured at the multi-stage cryocooler and the pressure-volume phase error; and
         adjusting a phase relationship between a pressure waveform and a volume waveform in the pressure-volume phase of the multi-stage cryocooler.

\* \* \* \* \*